(12) United States Patent
Hughes et al.

(10) Patent No.: US 11,525,475 B2
(45) Date of Patent: Dec. 13, 2022

(54) OBJECT HOLDER WITH QUICK-RELEASE ANCHORING CAPABILITY

(71) Applicant: Mighty Ventures, Inc., Rahway, NJ (US)

(72) Inventors: Jonathan Hughes, Wyndmoor, PA (US); Israel Harry Zimmerman, Los Angeles, CA (US)

(73) Assignee: Mighty Ventures, Inc., Rahway, NJ (US)

( * ) Notice: Subject to any disclaimer, the term of this patent is extended or adjusted under 35 U.S.C. 154(b) by 0 days.

(21) Appl. No.: 17/191,259

(22) Filed: Mar. 3, 2021

(65) Prior Publication Data
US 2022/0282753 A1 Sep. 8, 2022

(51) Int. Cl.
*F16B 47/00* (2006.01)
*F16M 13/02* (2006.01)

(52) U.S. Cl.
CPC ........... *F16B 47/00* (2013.01); *F16M 13/022* (2013.01)

(58) Field of Classification Search
CPC .............................. F16B 47/00; F16M 13/022
USPC ............ 248/205.5, 467, 205.8, 206.2, 206.3, 248/309.3, 362, 363
See application file for complete search history.

(56) References Cited

U.S. PATENT DOCUMENTS

| | | |
|---|---|---|
| 1,518,943 A | 12/1924 | Story |
| 1,753,611 A | 4/1930 | Lower |
| 1,778,175 A | 10/1930 | Thune |
| 1,840,400 A | 1/1932 | Lebherz |
| 2,083,299 A | 6/1937 | Hunter |
| 2,233,870 A | 3/1941 | Muter |
| 2,542,400 A | 2/1951 | Donofrio |
| 2,565,793 A | 8/1951 | Weismantel |

(Continued)

FOREIGN PATENT DOCUMENTS

| | | |
|---|---|---|
| CN | 1079886 A1 | 12/1993 |
| CN | 203987324 U | 12/2014 |

(Continued)

OTHER PUBLICATIONS

Zimmerman, "List of patents or Patent Applications Treated as Related", Apr. 4, 2022, 2 pages.

(Continued)

*Primary Examiner* — Muhammad Ijaz
(74) *Attorney, Agent, or Firm* — Walter W. Duft (57) ABSTRACT

An object holder with quick-release anchoring capability includes an object carrier having an object carrier base. A vacuum release actuator on the object carrier base is displaceable to separate from the object. An anchor member carried by vacuum release actuator includes outer and inner seal members and an interconnecting vent port. The outer seal member is arranged to form a substantially airtight seal with the reference surface that defines an outer controlled pressure zone. The inner seal member is arranged to form a substantially airtight seal with the object that defines an inner controlled pressure zone. The vent port extends between the outer and inner controlled pressure zones. During operation, the controlled pressure zones can be vented by manipulating the object carrier away from the reference surface to separate the object and the vacuum release actuator until the inner seal member breaks its substantially airtight seal with the object.

20 Claims, 8 Drawing Sheets

(56) References Cited

U.S. PATENT DOCUMENTS

| | | | |
|---|---|---|---|
| 2,601,279 A | 6/1952 | Hacus | |
| 2,740,545 A | 9/1956 | Bates | |
| 2,782,948 A | 2/1957 | Steinberg | |
| 2,839,260 A | 6/1958 | Jacobi, Jr. | |
| 2,895,636 A | 7/1959 | Martin | |
| 2,908,473 A | 10/1959 | Snyder | |
| 2,910,264 A | 10/1959 | Lindenberger | |
| 2,932,119 A | 4/1960 | Borah | |
| 2,936,139 A | 5/1960 | Lindstrom | |
| 2,963,256 A | 12/1960 | Borah | |
| 2,968,888 A | 1/1961 | Borah | |
| 3,094,235 A | 6/1963 | Lunning | |
| 3,159,370 A | 12/1964 | Rubinstein | |
| 3,383,001 A | 5/1968 | Wei | |
| 3,675,886 A | 7/1972 | Kampmier | |
| 3,847,324 A | 11/1974 | Uchanski et al. | |
| 4,040,549 A | 8/1977 | Sadler | |
| 4,127,211 A | 11/1978 | Zerbey | |
| 4,133,575 A | 1/1979 | Mader | |
| 4,137,356 A | 1/1979 | Shoemaker et al. | |
| 4,726,553 A | 2/1988 | Wischusen, III | |
| 4,756,497 A * | 7/1988 | Lan | F16B 47/00 248/346.11 |
| 4,759,525 A | 7/1988 | Cross et al. | |
| 4,760,987 A | 8/1988 | Lan | |
| 4,836,488 A | 6/1989 | Ross | |
| 4,872,721 A | 10/1989 | Sniadach | |
| 4,890,760 A | 1/1990 | Nicoll, Sr. et al. | |
| 4,928,848 A | 5/1990 | Ballway | |
| 4,940,138 A | 7/1990 | Hornstein | |
| 4,941,635 A | 7/1990 | Lan | |
| 4,955,493 A | 9/1990 | Touzani | |
| 4,978,566 A | 12/1990 | Scheurer et al. | |
| 5,040,719 A | 8/1991 | Ballway | |
| 5,065,973 A | 11/1991 | Wang | |
| 5,071,096 A | 12/1991 | Hartman et al. | |
| 5,076,527 A | 12/1991 | Yung-Huei | |
| 5,133,524 A | 7/1992 | Liu | |
| 5,180,132 A | 1/1993 | Pearson et al. | |
| 5,186,350 A | 2/1993 | McBride | |
| 5,192,043 A | 3/1993 | Fa | |
| 5,207,076 A | 5/1993 | Sciarrillo | |
| 5,273,182 A | 12/1993 | Laybourne | |
| 5,282,541 A | 2/1994 | Chen | |
| 5,292,140 A | 3/1994 | Laing | |
| 5,381,990 A | 1/1995 | Belokin et al. | |
| D357,170 S | 4/1995 | Wellsfry | |
| 5,413,302 A | 5/1995 | Ferster | |
| 5,511,752 A | 4/1996 | Trethewey | |
| 5,531,353 A | 7/1996 | Ward et al. | |
| 5,667,180 A | 9/1997 | Duckworth | |
| 5,742,971 A | 4/1998 | Salinger | |
| D397,915 S | 9/1998 | McNaughton | |
| D400,763 S | 11/1998 | Taylor et al. | |
| 5,992,806 A | 11/1999 | Adams | |
| 6,000,575 A | 12/1999 | LaCour et al. | |
| 6,039,206 A | 3/2000 | DeFrancesco | |
| 6,059,138 A | 5/2000 | Labruyere | |
| D439,116 S | 3/2001 | White | |
| 6,264,054 B1 | 7/2001 | Miyake et al. | |
| 6,315,153 B1 | 11/2001 | Osborn | |
| 6,318,683 B1 | 11/2001 | Savoy | |
| 6,367,652 B1 | 4/2002 | Toida et al. | |
| 6,439,418 B1 | 8/2002 | Immerman et al. | |
| 6,491,265 B2 | 12/2002 | Tracy | |
| 6,497,394 B1 | 12/2002 | Dunchock | |
| 6,511,031 B2 | 1/2003 | Lin | |
| 6,520,368 B1 | 2/2003 | Chiu | |
| 6,543,637 B1 | 4/2003 | Osborn | |
| 6,571,976 B1 | 6/2003 | Sonnabend | |
| 6,596,374 B1 | 7/2003 | Adjeleian | |
| 6,666,420 B1 | 12/2003 | Carnevali | |
| 6,745,987 B2 | 6/2004 | Rousselet et al. | |
| 6,776,368 B1 | 8/2004 | Duncan et al. | |
| 6,895,642 B2 | 5/2005 | Huang | |
| 7,090,183 B2 | 8/2006 | Heybl et al. | |
| 7,201,285 B2 | 4/2007 | Beggins | |
| 7,306,113 B2 | 12/2007 | El-Saden et al. | |
| 7,458,541 B1 | 12/2008 | Chang | |
| 7,481,329 B2 | 1/2009 | Camp, Jr. | |
| 7,726,715 B2 | 6/2010 | Nagasawa et al. | |
| 8,025,169 B2 | 9/2011 | Zimmerman | |
| 8,028,850 B2 | 10/2011 | Zimmerman | |
| 8,272,523 B1 | 9/2012 | Demusis, Sr. | |
| 8,757,418 B2 | 6/2014 | Zimmerman | |
| 9,521,919 B1 | 12/2016 | Reyes | |
| 9,651,229 B1 | 5/2017 | Huang | |
| 9,801,483 B2 | 10/2017 | D'Alesio | |
| 9,814,332 B2 * | 11/2017 | Zimmerman | A47G 19/10 |
| 9,950,432 B1 * | 4/2018 | Huang | B25J 15/0616 |
| 10,520,009 B2 | 12/2019 | Smith et al. | |
| 11,255,482 B1 | 2/2022 | Zimmerman | |
| 2002/0130133 A1 | 9/2002 | Immerman et al. | |
| 2003/0075666 A1 | 4/2003 | Dunchock | |
| 2003/0102320 A1 | 6/2003 | Park | |
| 2004/0238541 A1 | 12/2004 | Camp, Jr. | |
| 2004/0238542 A1 | 12/2004 | Camp, Jr. et al. | |
| 2006/0175506 A1 | 8/2006 | Lan | |
| 2007/0012706 A1 | 1/2007 | Deadman | |
| 2007/0205205 A1 | 9/2007 | Kliewer | |
| 2008/0093370 A1 | 4/2008 | Darsey | |
| 2008/0190948 A1 | 8/2008 | Sayasithsena | |
| 2008/0210834 A1 * | 9/2008 | Takahashi | F16B 47/00 248/205.8 |
| 2009/0250467 A1 | 10/2009 | Schmidt | |
| 2009/0256043 A1 | 10/2009 | Lan | |
| 2010/0155550 A1 | 6/2010 | Weiss-Vons | |
| 2012/0287560 A1 | 11/2012 | Fan | |
| 2014/0171157 A1 | 6/2014 | Ho | |
| 2014/0326630 A1 | 11/2014 | Henry | |
| 2015/0230638 A1 | 8/2015 | Jagger | |
| 2018/0149302 A1 * | 5/2018 | Papapanos | F16M 13/022 |
| 2019/0022874 A1 * | 1/2019 | Mutch | B25J 15/0675 |
| 2019/0024699 A1 | 1/2019 | Mutch et al. | |
| 2019/0203759 A1 * | 7/2019 | Zimmerman | A47L 13/16 |
| 2020/0400267 A1 | 12/2020 | Garza | |

FOREIGN PATENT DOCUMENTS

| | | |
|---|---|---|
| CN | 204015832 U | 12/2014 |
| CN | 204105618 U | 1/2015 |
| CN | 104545306 A | 4/2015 |
| CN | 204291083 U | 4/2015 |
| CN | 204500194 U | 4/2015 |
| CN | 105996687 A | 10/2016 |
| DE | 3742636 | 1/1989 |
| EP | 1649788 | 4/2006 |
| JP | H05187430 A | 7/1993 |
| JP | 2000104724 A | 4/2000 |
| JP | 2003501315 | 1/2003 |
| JP | 2004160079 | 10/2004 |
| JP | 2006314739 | 11/2006 |
| JP | 2014173709 A | 9/2014 |
| WO | WO2012008942 | 1/2012 |
| WO | WO2019097212 A1 | 5/2019 |

OTHER PUBLICATIONS

KIPO, PCT International Search Report, PCT International Application No. PCT/2022/070932 entitled "Object Holder, Handheld Electronic Device Case, and Universal Vacuum Connector With Quick-Release Anchoring Capability", Jul. 11, 2022, 3 pages.

KIPO, Written Opinion of the International Searching Authority, PCT International Application No. PCT/2022/070932 entitled "Object Holder, Handheld Electronic Device Case, and Universal Vacuum Connector With Quick-Release Anchoring Capability", Jul. 11, 2022, 9 pages.

\* cited by examiner

OBJECT HOLDER WITH QUICK-RELEASE ANCHORING CAPABILITY

BACKGROUND

1. Field

The present disclosure relates to anchoring apparatus for releasably securing objects to surfaces. More particularly, the disclosure concerns anchoring apparatus with anchor members that adhere to surfaces by way of differential pressure when flexed. Still more particularly, the disclosure pertains to an object holder with quick-release differential pressure anchoring capability.

2. Description of the Prior Art

By way of background, anchoring apparatus that operate by way of differential pressure are known. Such apparatus often utilize anchor members such as suction cups and suction seal stabilizers. A suction cup typically includes a flexible seal member configured as an elastomeric cup-shaped structure having a concave side and a relatively soft peripheral rim. In order to adhere the suction cup to a reference surface, the seal member must be affirmatively flexed by pressing it against the reference surface with enough force to temporarily flatten the concave lower side so that air is expelled outside the peripheral rim. When the pressing force is released, the seal member has a natural tendency to return to its initial configuration. As this rebounding occurs, the volumetric cavity that lies inside the peripheral rim between the seal member's lower side and the reference surface begins to enlarge. This in turn causes the air pressure in the volumetric cavity to proportionately decrease in accordance with Boyle's Law. A negative pressure differential is generated in which the pressure within the volumetric cavity is lower than the ambient air pressure outside the cavity, thereby resulting in a partial vacuum. The partial vacuum produces a suction force that increases until an equilibrium condition is reached wherein the elastic forces tending to return the seal member to its initial configuration are balanced by the vacuum forces. Attempts to pull the suction cup away from the reference surface will only increase the size of the volumetric cavity and further decrease the air pressure therein. The resultant suction force will continue to increase until the pulling force becomes large enough to break the seal between the seal member's peripheral rim and the reference surface.

Some suction cups are designed so that they can only be removed from the reference surface by applying sufficient brute force to break the seal formed by the seal member's peripheral rim, or by peeling up the rim to create a small opening that vents the volumetric cavity. Other suction cups are designed with a vent port and are used with a mechanical stopper made of rigid (or semi-rigid) material. The stopper is manually actuated into engagement with the vent port when it is desired to maintain suction, and is manually actuated out of engagement with the vent port when it is desired to break the suction. The stopper is typically hand-operable and cannot be actuated except by way of a specific movement pattern that involves the stopper being moved a noticeable distance.

A suction seal stabilizer includes a seal member that operates somewhat similarly to a suction cup's seal member, but is typically less concave, or even flat, and usually made from a softer more resilient material. Alternatively, the seal member of a suction seal stabilizer may be constructed of the same material as a suction cup seal member, but is thinner and more flexible than its suction cup counterpart. When a properly designed suction seal stabilizer is placed on a reference surface, little or no pushing force needs to be applied to flatten the seal member. Such devices are thus generally self-sealing (self-anchoring). Because the seal member is usually highly flexible and may have little or no concavity, its elastic rebound forces may be relatively weak. If the seal member remains substantially flat against the reference surface with little or no rebound occurring, the suction forces will be negligible or non-existent until the anchoring apparatus is acted upon by a load. If the reference surface is substantially horizontal, the load that generates suction forces may be a lifting or tilting load applied to the anchoring apparatus or an item being carried thereby.

In a typical suction seal stabilizer, a vent port is provided for releasing the stabilizer from the reference surface. In such designs, an anchoring apparatus that incorporates the suction seal stabilizer may include a movable component that acts as a mechanical stopper to open and close the vent port. The movable component may be configured to carry an item or material that is to be anchored by the anchoring apparatus. Displacing the component away from the vent port causes the vent port to open, allowing the anchoring apparatus to be moved away from the reference surface without appreciable resistance. This provides a form of stealth mode operation in which the user is not aware of the action of the suction seal stabilizer. When the anchoring apparatus is placed back onto the reference surface, the movable auxiliary component will reengage the vent port, thereby "arming" the suction seal stabilizer into a stabilizing mode.

It is to improvements in the design of anchoring apparatus having anchor members embodied as suction cups or suction seal stabilizers that the present disclosure is directed. More particularly, the present disclosure provides an anchoring apparatus embodied as an object holder that holds an object for quick-release anchoring to a reference surface.

SUMMARY

An object holder with quick-release anchoring capability includes an object carrier configured to hold an object while maintaining a fixed positional relationship therewith. The object carrier includes an object carrier base arranged for interposition between the object and an external reference surface when the object is mounted to the reference surface using the object holder. A vacuum release actuator is disposed on the object carrier base and is displaceable relative to the object carrier base in order to separate from the object along an axis that extends normal to the reference surface. An anchor member is carried by the vacuum release actuator. The anchor member includes a flexible outer seal member, a flexible inner seal member, and an interconnecting vent port. The outer seal member is arranged to engage the reference surface and form a substantially airtight seal therewith that defines an outer controlled pressure zone, the outer controlled pressure zone including a region located between the outer seal member and the reference surface. The inner seal member is arranged to engage the object and form a substantially airtight seal therewith that defines an inner controlled pressure zone, the inner controlled pressure zone including a region located between the inner seal member and the object. The vent port has an outer end in fluid communication with the outer controlled pressure zone and an inner end in fluid communication with the inner controlled pressure zone. During operation, the object holder holds the object and mounts to the reference surface by virtue of the controlled pressure zones maintaining a negative pressure differential relative to an external ambient pressure. The controlled pressure zones can be vented by manipulating the object carrier away from the reference surface to separate the object and the vacuum release actuator until the inner seal member breaks its substantially airtight seal with the object.

BRIEF DESCRIPTION OF THE DRAWINGS

The foregoing and other features and advantages will be apparent from the following more particular description of example embodiments, as illustrated in the accompanying Drawings.

DETAILED DESCRIPTION OF EXAMPLE EMBODIMENTS

Figure 1:
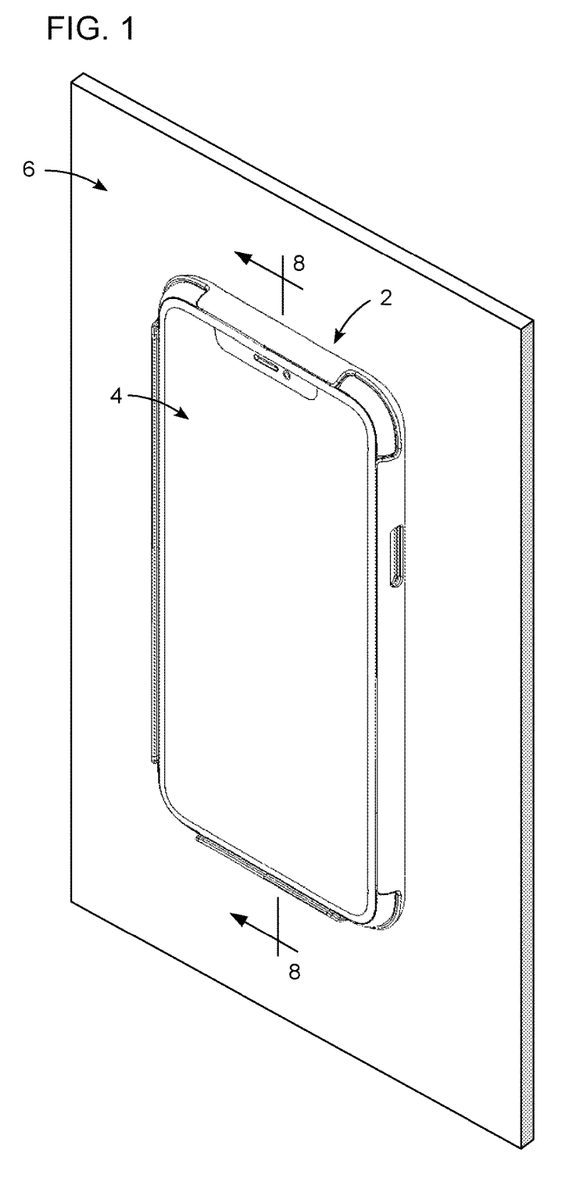
FIG. 1 is a front perspective view showing an assembly formed by an example embodiment of an object holder with quick-release anchoring capability that carries an object and mounts it a reference surface.
Figure 2:
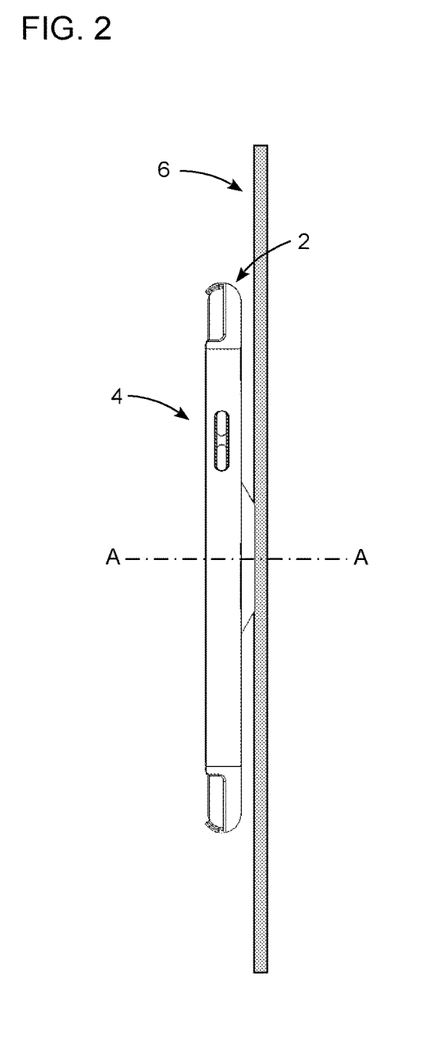
FIG. 2 is a side view of the assembly of FIG. 1.

Turning now to the drawing figures, in which like reference numbers illustrate like structure in all of the several views, FIGS. 1-2 illustrate one possible embodiment of an object holder 2 having quick-release anchoring capability that may be constructed in accordance with the present disclosure. The object holder 2 is designed to hold an object 4 for detachable mounting to an external reference surface 6. In the illustrated embodiment, the object 4 is depicted as a smartphone or other handheld electronic device. However, alternate embodiments of the object holder 2 may be constructed in accordance with the principles of the present disclosure for holding and detachably mounting many other kinds of objects.

In the illustrated embodiment, the reference surface 6 is shown as being vertical. However, the object holder 2 could just as easily be used to mount the object 4 to horizontal reference surfaces or to inclined reference surfaces oriented at any arbitrary angle lying between vertical and horizontal.

It will be appreciated that the types of reference surfaces on which the object 4 may be mounted using the object holder 2 are virtually unlimited. As described in more detail below, the only requirement for a suitable reference surface is that it be capable of forming a suction seal with the object holder 2. Without limitation, examples of possible reference surfaces include walls, doors, windows, appliances, cabinetry, desks, tables, shelves, counters, surfaces located on or within transportation equipment, such as landcraft, aircraft or watercraft, and many others.

Figure 3:
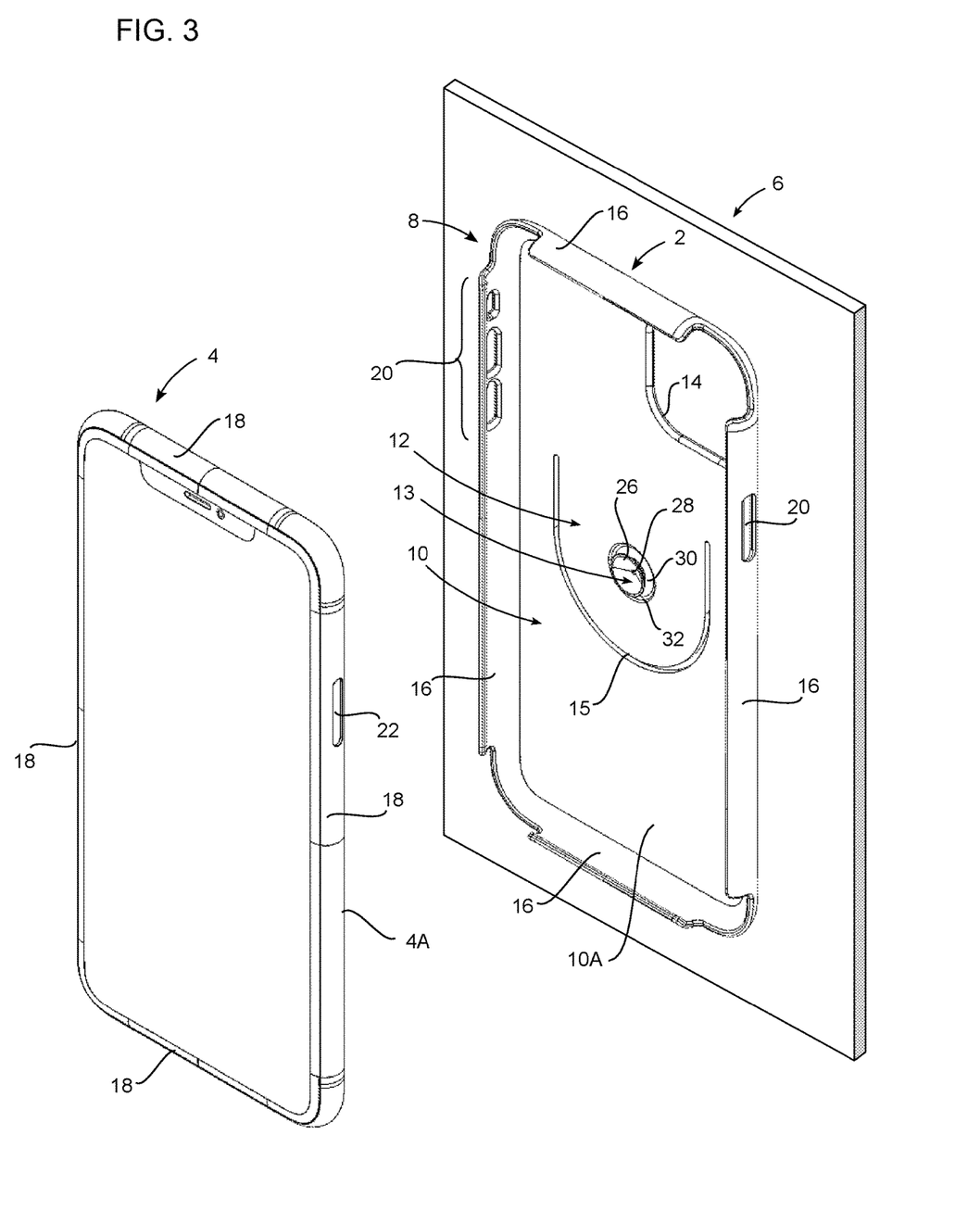
FIG. 3 is an exploded front perspective view showing the object, object holder and reference surface of FIG. 1.
Figure 4:
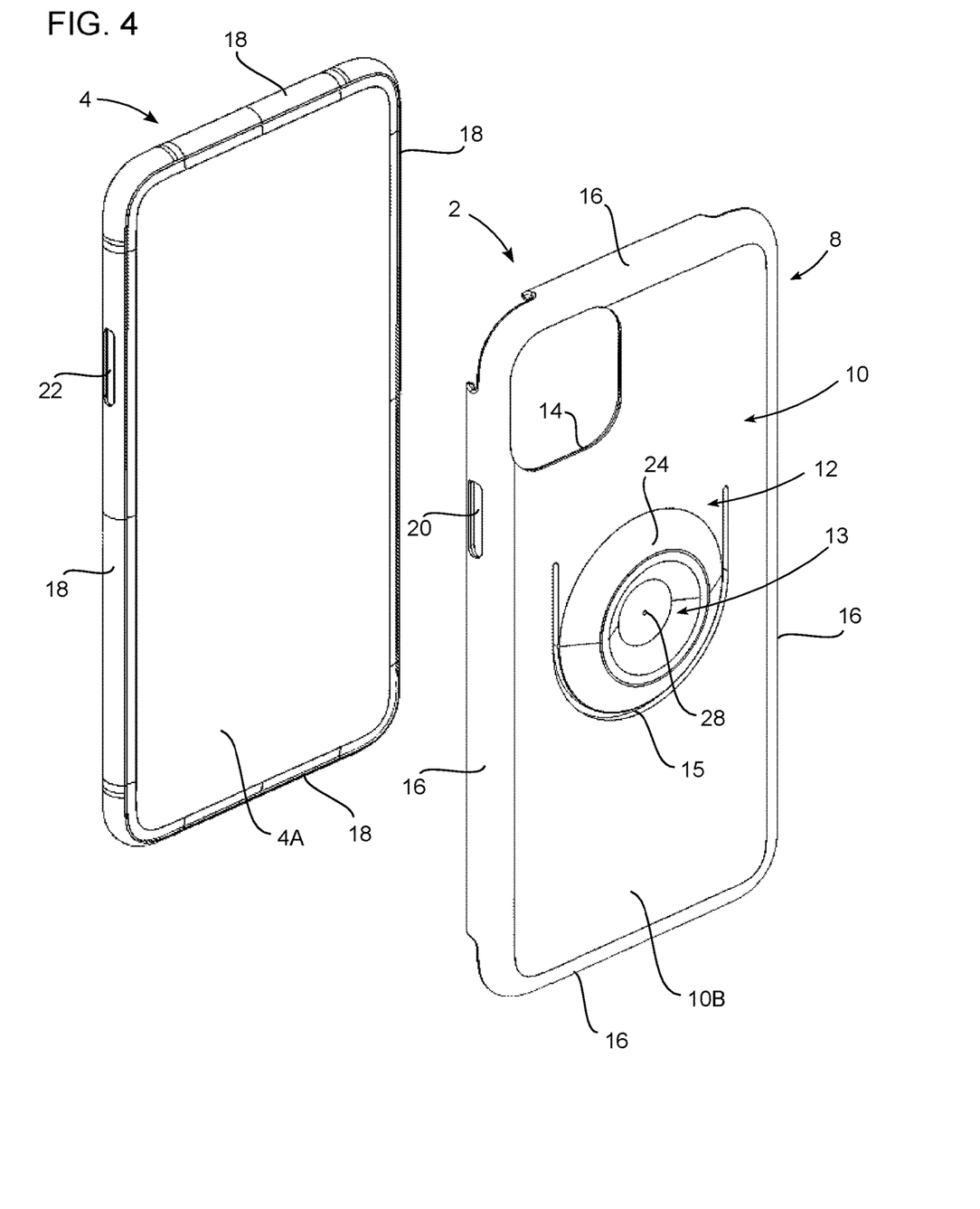
FIG. 4 is an exploded rear perspective view showing the object and object holder of FIG. 1.

With additional reference now to FIGS. 3 and 4, the object holder 2 includes an object carrier 8 that may be constructed from any material having desired rigidity (e.g., rigid, semi-rigid, non-rigid), including but not limited to a plastic such as polypropylene or polyurethane, a composite material such as carbon fiber, a metal such as titanium or aluminum, an elastomeric material such as silicone rubber, leather or synthetic leather, and or even wood or wood laminate.

The object carrier 8 is configured to hold the object 4 while maintaining a fixed positional relationship therewith. In other words, the object carrier 8 as a whole does not move relative to the object 4 while the latter is being held by object holder 2. The object 4 and the object carrier 8 move in unison with each other. When one moves, the other moves, and visa versa.

The object carrier 8 includes an object carrier base 10 arranged for interposition between the object 4 and the reference surface 6 when the object is mounted to the reference surface using the object holder 2. A vacuum release actuator 12 is disposed on the object carrier base 10, and carries a double-seal flexible anchor member 13 that provides vacuum (suction) mounting capability. The vacuum release actuator 12 is displaceable relative to the object carrier base in order to separate therefrom, and from the object 4 itself, along an axis A-A (see FIG. 2) that extends normal to the reference surface 6.

In the illustrated embodiment wherein the object 4 is a smartphone or other handheld electronic device, the object carrier base 10 may be configured as a plate or other substantially planar structure having an inner side 10A (FIG. 3) arranged to face the object and an outer side 10B (FIG. 4) arranged to face the reference surface 6. In this configuration, the object carrier base 10 is substantially completely interposed between the object 4 and the reference surface 6. With the exception of one or more optional openings or other discontinuities in the object carrier base 10, the object carrier base may be formed as a solid unbroken sheet of material whose interior side 10A may extend across substantially an entire rear side 4A of the object 4 that faces the reference surface 6.

One example of an optional opening or discontinuity that may be provided in the object carrier base 10 is an opening 14 that provides access to a functional component of object 4, in this case an array of one or more smartphone rear cameras. Another example of an optional opening or discontinuity that may be provided in the object carrier base 10 is a U-shaped discontinuity 15 that may be formed as a slot (or slit) to define the vacuum release actuator 8. This construction is described in more detail below.

The object carrier 8 may further include one or more object holding elements 16 arranged around the periphery of the object carrier base 10. Four object holding elements 16 are shown in FIGS. 3 and 4. In the illustrated embodiment, the object holding elements 16 are flexible structures that may be integrally formed with the object carrier base 10. The object holding elements 16 are angled out-of-plane relative to a major surface portion of the object carrier base, namely the major surface defined by the inner side 10A that faces the object 4 and the outer side 10B that faces the reference surface 6. This allows the object holding elements 16 to engage, grip and hold the side edges 18 of the object 4, which are generally orthogonal to (and do not face) the reference surface 6. In this way, the object carrier 8 may be firmly secured to the object 4. A smartphone's side edges typically have a curved profile. Thus, in the illustrated embodiment, the interior surfaces of the object holding elements 16 may likewise have a curved profile that matches the smartphone's edge profile. Like the object carrier base 10, some or all of the object holding elements 16 may be formed with one or more openings or other discontinuities that provide access to corresponding portions of the object 4. For example, the illustrated embodiment depicts optional openings 20 in two of the object holding elements 16. These optional openings 20 provide access to various smartphone function control buttons, such as the power button 22.

It should be understood that the above-described configuration of the object carrier 8 represents only one possible embodiment of the disclosed subject matter. In alternate embodiments, the object carrier 8 could have various other configurations. These other configurations may depend in whole or in part on the configuration of the object 4 being carried. For example, although the object carrier base 10 is substantially planar in the illustrated embodiment (due to the object 4 being a smartphone), non-planar (e.g., curved) configurations are also envisioned. Similarly, although the object carrier base 10 is shown as being relatively thin between its inner side 10A and its outer side 10B (as compared to its length and width dimensions), this is not a requirement.

The object carrier base 10 also need not be substantially solid (i.e., with only minor openings or discontinuities). In alternate embodiments, the object carrier base 10 could be a substantially discontinuous structure. One example of a discontinuous object carrier base construction would be a honeycomb web or other mesh-like or screen-like structure that includes a pattern of perforations. Another example of a discontinuous object carrier base construction would be a truss structure formed by any number of small beam-like or girder-like elements suitably arranged to support the object 4. Possible truss configurations a two-element X-shaped structure, a three-element Y-shaped structure, a three-element H-shaped structure, etc.

In still further alternate embodiments, the object carrier 8 could be formed with an object carrier base 10 but no sidewalls 16 for gripping and holding the object 4. In that case, the object carrier base 10 could be removably (or permanently) mounted to the object 4 using fasteners, adhesive bonding, or other techniques.

With continuing reference to FIGS. 3-4, the vacuum release actuator 12 may be disposed proximate to a central portion of the object carrier base 10. Alternatively, the vacuum release actuator 12 may be formed at an off-center location. In the illustrated embodiment, the vacuum release actuator 12 is integrally formed on the object carrier base 10 as a generally U-shaped flap (with other flap configurations also being possible). The flap is created by the previously-mentioned U-shaped slot 15 that represents a discontinuity in the object carrier base 10. By virtue of its flap construction, the vacuum release actuator 12 may be thought of as being formed by a flexible portion the object carrier base 10, the remainder of which may be comparatively non-flexible. More specifically, the vacuum release actuator 12 may be thought of as representing a pivotable or bendable portion of the object carrier base 10.

Although not shown, alternate embodiments could utilize other constructions to implement the vacuum release actuator 13. Thus, the vacuum release actuator 12 need not be integrally formed on the object carrier base 10, and need not be formed as a flap or other pivotable or bendable structure. It could, for example, be formed a linearly movable member, such as a disk, that resides in an opening formed in the object carrier base 10 and is movably attached thereto using a suitable flexible connector configuration. If the vacuum release actuator 12 is integrally formed with the object carrier base 10, the flexible connectors could be living hinges. If the vacuum release actuator 12 is not integrally formed with the object carrier base 10, other types of flexible connectors could be used.

In still other alternate embodiments, the vacuum release actuator 12 might not be a definitively-formed element at all. For example, if the object carrier base 10 is formed from a sufficiently flexible material, and if it is thin enough so that a central portion thereof can flex and displace out-of-plane relative to an edge portion thereof (i.e., along axis A-A of FIG. 1), the flexing and displaceable central portion could serve as the vacuum release actuator 12.

Figure 5:
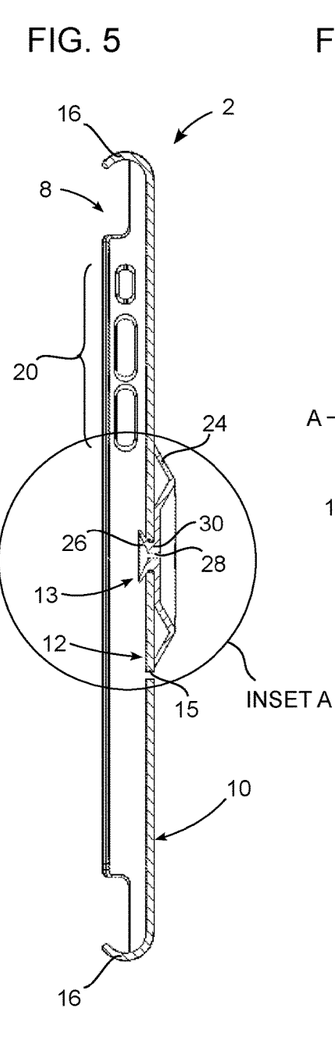
FIG. 5 is a vertical cross-sectional centerline view of the object holder of FIG. 1.
Figure 6:
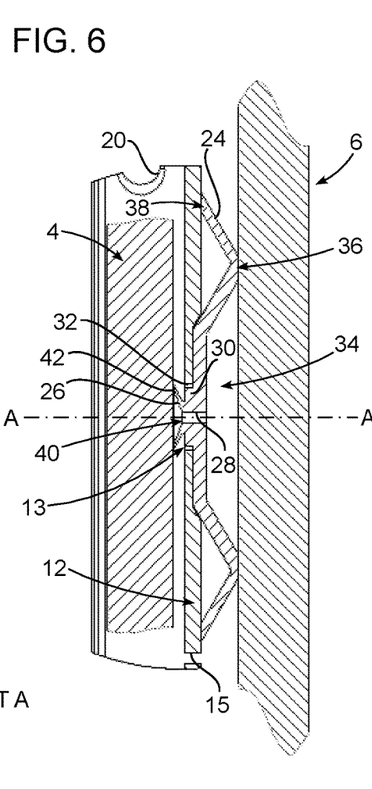
FIG. 6 is an enlarged vertical cross-sectional centerline view depicting the structure shown in Inset A of FIG. 5.

With continuing reference to FIGS. 3-4, and with additional reference also to FIGS. 5-6, the anchor member 13 includes a flexible outer seal member 24, a flexible inner seal member 26, and an interconnecting vent port 28. In the illustrated embodiment, the anchor member 13 further includes a central hub 30 disposed between the outer seal member 24 and the inner seal member 26. The central hub 30 may be used to mount the anchor member 13 to the vacuum release actuator 12. In particular, as best shown in FIGS. 3 and 6, the central hub 30 of the anchor member 13 may be seated in a through-bore or other opening 32 formed in the vacuum release actuator 12. In the illustrated embodiment, the anchor member 13, including the outer seal member 24, the inner seal member 26, and the central hub 30, may be formed of a flexible resilient material having an appropriate hardness and density. Silicone rubber represents one such material. Other resilient materials may also be used.

Figure 7:
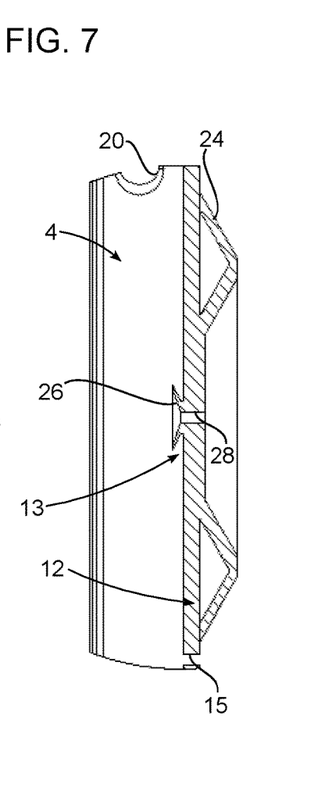
FIG. 7 is an enlarged vertical cross-sectional centerline view depicting a modified version of the structure shown in Inset A of FIG. 5.

In an alternate embodiment, instead of forming the anchor member 13 as a discrete component that is mounted to the vacuum release actuator 12, the anchor member could be integrally formed therewith. This is shown in FIG. 7. In that case, the central hub 30 of the anchor member 13 may be integrated with the structure that forms the vacuum release actuator 12. This means that the vacuum release actuator 12 and the anchor member 13 will be formed from the same material. In the event that the vacuum release actuator 12 is integrally formed as part of the object carrier base 10, the object carrier base or even the entire object carrier 8 itself may likewise be formed of the same material as both the vacuum release actuator and the anchor member 13. For example, silicone rubber of suitable hardness and density may be used to form a unitary injection-molded structure that provides the anchor member 13, the vacuum release actuator 12, and the object carrier base 10 or the entire object carrier 8.

As best shown in FIG. 6, the outer seal member 24 is arranged to engage the reference surface 6 and form a substantially airtight seal therewith that defines an outer controlled pressure zone 34. The outer controlled pressure zone 34 represents the enclosed air-space region located between the outer seal member 24 and the reference surface 6. In the illustrated embodiment the outer seal member 24 is shown as being cup-shaped, which allows the outer seal member to function as suction cup or a suction seal stabilizer, depending on the stiffness of the material and the axial force required to adhere it to the reference surface 6. In alternate embodiments, the outer seal member 26 might not be cup-shaped, and could be substantially flat, if so desired, even when the object holder 2 is in an unmounted state. In the illustrated embodiment, the periphery of the controlled pressure zone 34 is defined by a circular ring of contact where an axially protruding outer rim 36 of the outer seal member 24 makes suction contact with the reference surface 6. For aesthetic reasons, the outer rim 36 may be situated radially inboard from a circumferential outer edge 38 of the outer seal member 24. The outer edge 38 is axially offset from outer rim 36 so as form an axially inverted radial outer cup configured so that the outer edge lies against the outer surface of the vacuum release actuator 12.

The inner seal member 26 is arranged to engage the object 4 and form a substantially airtight seal therewith that defines an inner controlled pressure zone 40. The inner controlled pressure zone 40 represents the enclosed air-space region located between the outer seal member 24 and the reference surface 6. In the illustrated embodiment the inner seal member 26 is shown as being cup-shaped, which allows the inner seal member to function as suction cup or a suction seal stabilizer, depending on the stiffness of the material and the axial force required to adhere it to the object 4. In alternate embodiments, the inner seal member 26 might not be cup-shaped, and could be substantially flat, if so desired, even when the object holder 2 is in an unmounted state. In the illustrated embodiment, the periphery of the controlled pressure zone 40 is defined by a circular ring of contact where an axially protruding inner rim 42 of the inner seal member 26 makes suction contact with the object 4.

The vent port 28 has an outer end in fluid communication with the outer controlled pressure zone 34 and an inner end in fluid communication with the inner controlled pressure zone 40. When the outer seal member 24 is in suction contact with the reference surface 6, and the inner seal member 26 is in suction contact with the object 4, the interconnecting vent port 28 provides an air pathway between the outer controlled pressure zone 34 and the inner controlled pressure zone 40. The vent port 28 thus equalizes the air pressure in the two controlled pressure zones 34/40. Notwithstanding this equalization of air pressure, the suction force generated by the outer seal member 24 against the reference surface 6 will be significantly larger than the suction force generated by the inner seal member 26 against the object 4. This is because the area of the outer seal member 24 that lies within the outer rim 36 is substantially larger than the area of the inner seal member 26 that lies within the inner rim 42. For example, if the diameter of the inner rim 42 is 1 cm and the diameter of the outer rim 36 is 5 cm, the outer rim diameter will be five times larger than the inner rim diameter. However, the surface area, and hence the suction force, is based on the square of the relative diameters. As such, in the example given, the suction force generated by the outer seal member 24 will be twenty-five times larger than the suction force generated by the inner seal member 26. As will described below, this suction force differential dictates the operational characteristics of the object holder 2.

Figure 8A:
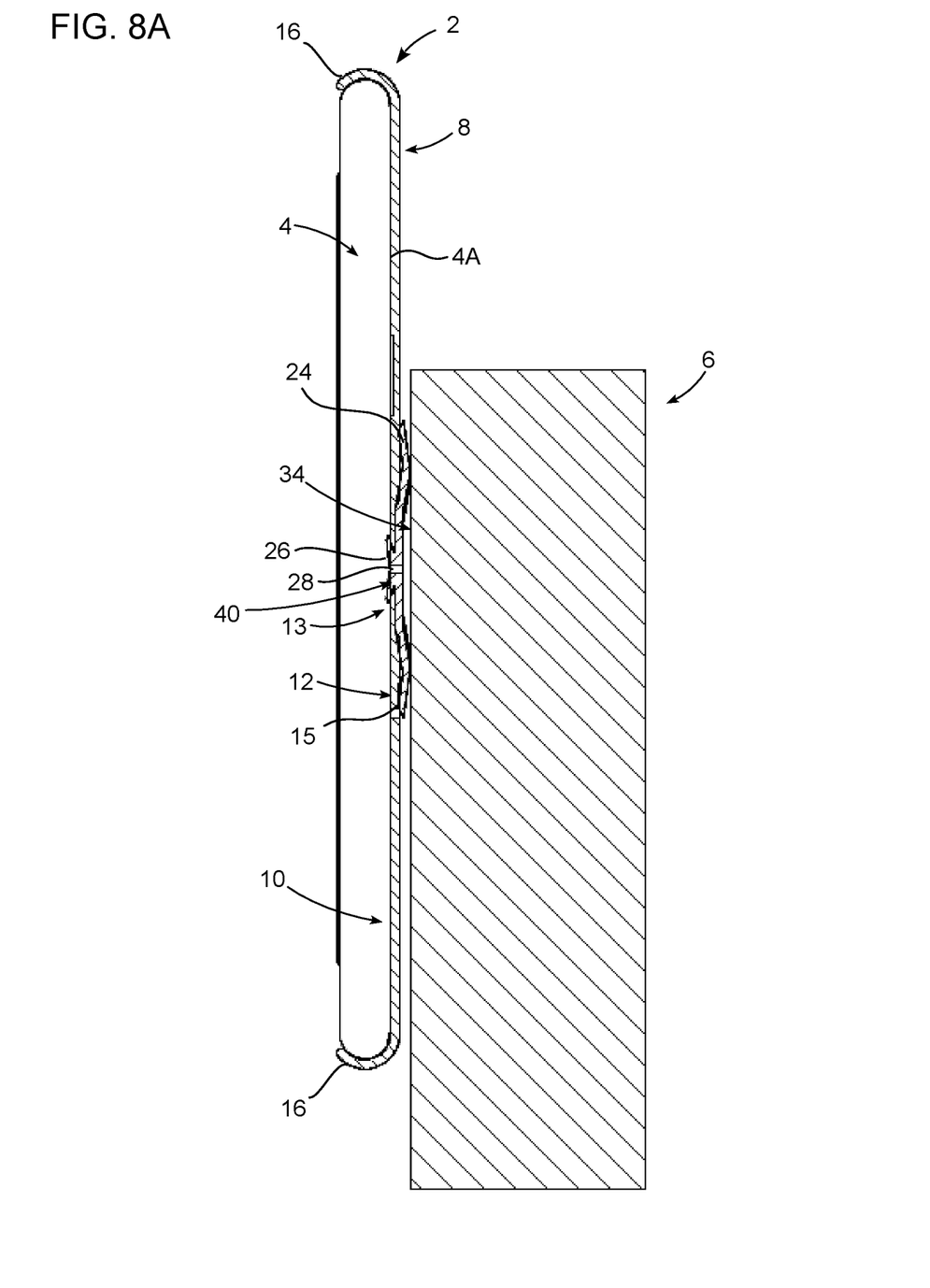
FIG. 8A is a cross-sectional view taken along line 8-8 in FIG. 1, showing the object holder and the object held thereby being mounted to the reference surface.

With reference now to FIGS. 8A-8D, the object holder 2 is shown in FIG. 8A as being in a mounted state wherein it holds the object 4 and mounts it to the reference surface 6. The mounted state of FIG. 8A may be effected by initially installing the object 4 in the object carrier 8. This installation will place the back side 4A of the object 4 in sealing engagement with the inner seal member 26. If the inner seal member 26 is cup-shaped, as in the illustrated embodiment, the process of installing the object 4 in the object carrier 8 may tend to deform the inner seal member as a result of pressing the object against it. In that case, the inner seal member 26 may become partially or wholly axially compressed (i.e., flattened). This flattening is illustrated in FIG. 8A.

Once the object 4 is installed in the object carrier 8, the object holder 2 may be mounted to the reference surface 6 by maneuvering it in a manner that pushes the outer seal member 24 into sealing engagement with the reference surface. If the outer seal member 24 is cup-shaped, as in the illustrated embodiment, the pushing force applied to the object holder 2 to maneuver the outer seal member into sealing engagement with the reference surface 6 may tend to deform the outer seal member. In that case, the outer seal member 24 may become partially or wholly axially compressed (i.e., flattened). This flattening is illustrated in FIG. 8A.

Once the object holder 2 carrying the object 4 is mounted to the reference surface 6 in the manner described above, a suction force will have been established that holds the object holder in position. The outer controlled pressure zone 34 will become sealed by virtue of the sealing engagement between the outer seal member 24 and the reference surface 6. The inner controlled pressure zone 40 will become sealed by virtue of the sealing engagement between the inner seal member 26 and the object 4.

Letting go of the object holder 2 following mounting will result in a restorative spring-back force developing in the outer seal member 24 to the extent that it was compressibly deformed during the mounting process. This restorative spring-back force will tend to increase the volume of the outer controlled pressure zone 34. In addition, the weight of the object holder 2 and the object 4 will likewise deform the outer seal member 24 in a manner that tends to increase the volume of the outer controlled pressure zone 34. Because the outer controlled pressure zone 34 is in fluid communication with the inner controlled pressure zone 40 by virtue of the interconnecting vent port 28, a negative pressure differential will collectively develop in both controlled pressure zones with respect to the external ambient air pressure outside the controlled pressure zones. This negative pressure differential will provide a suction force between the outer seal member 24 and the reference surface 6, and between the inner seal member 26 and the object 4. The object holder 2 carrying the object 4 may thereby remaining affixed to the reference surface 6 for an indefinite period of time.

Figure 8B:
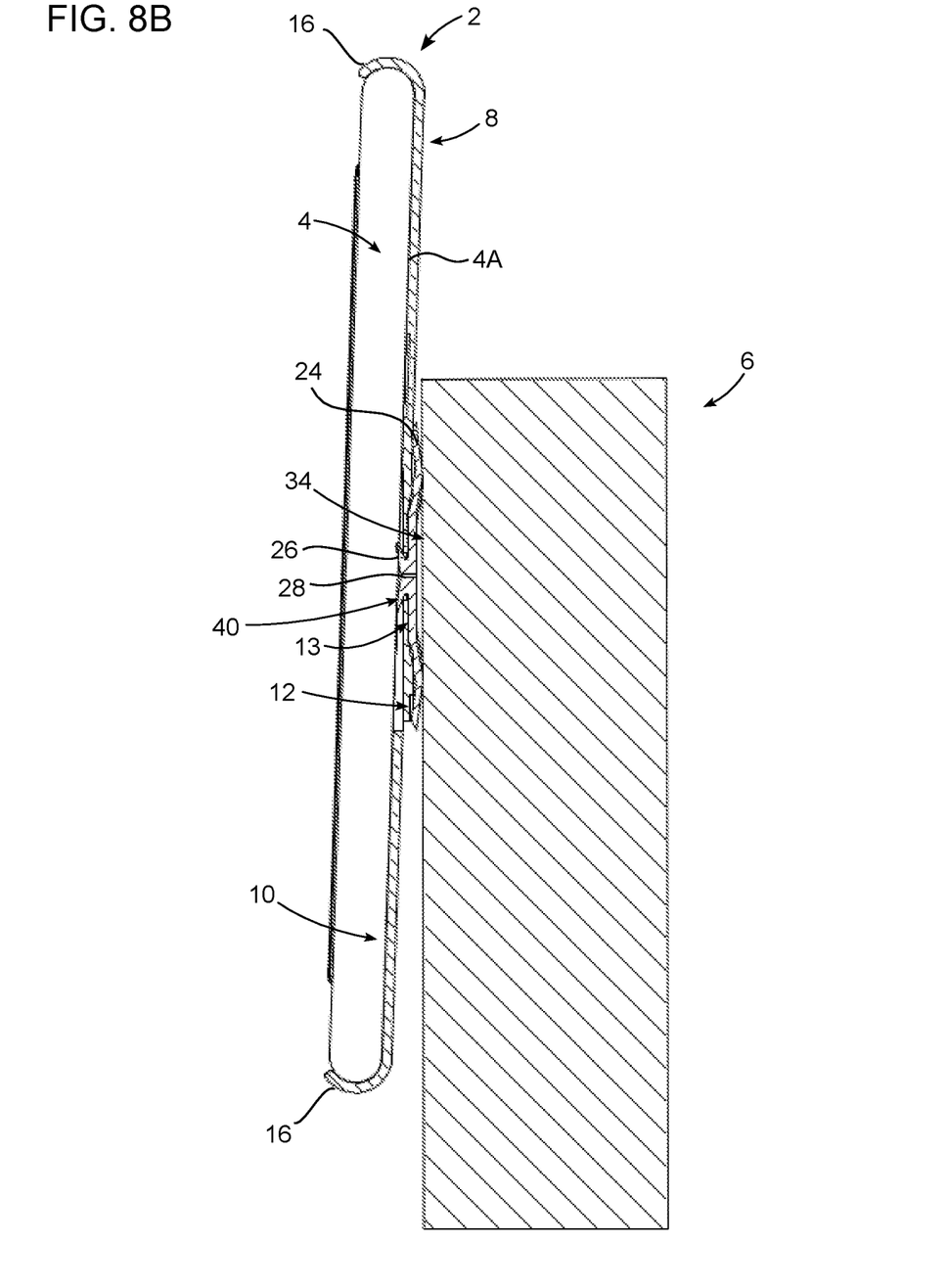
FIG. 8B is a cross-sectional view corresponding to FIG. 8A, showing a first stage of object holder detachment in which the object holder and the object held thereby have undergone initial movement away from the reference surface.

When it is desired to detach the object holder 2 from the reference surface 6, the object holder 2 can be grasped and maneuvered away from the reference surface. Doing so will displace the vacuum release actuator 12 relative to the object carrier base 10, as shown in FIG. 8B. The displacement of the vacuum release actuator 12 relative to the object carrier base 2 results from the strong suction force between the outer seal member 24 and the reference surface 6. This suction force results acts on the anchor member 13, and therefore also acts on the vacuum release actuator 12 to which the anchor member is mounted. Because the vacuum release actuator 12 is displaceable relative to the object carrier base 10, the object carrier base can move away from the reference surface while the vacuum release actuator 12 and the anchor member 13 do not. In the illustrated embodiment wherein the vacuum release actuator 12 is formed as a flap, the resultant displacement of the vacuum release actuator relative to the object carrier base 10 is depicted in FIG. 8B as a slight out-of-plane bending or pivoting of the vacuum release actuator. Notwithstanding such displacement, the inner seal member 26 will tend to remain attached to the object 4 so long as the suction force between the inner suction member and the object is not exceeded.

Figure 8C:
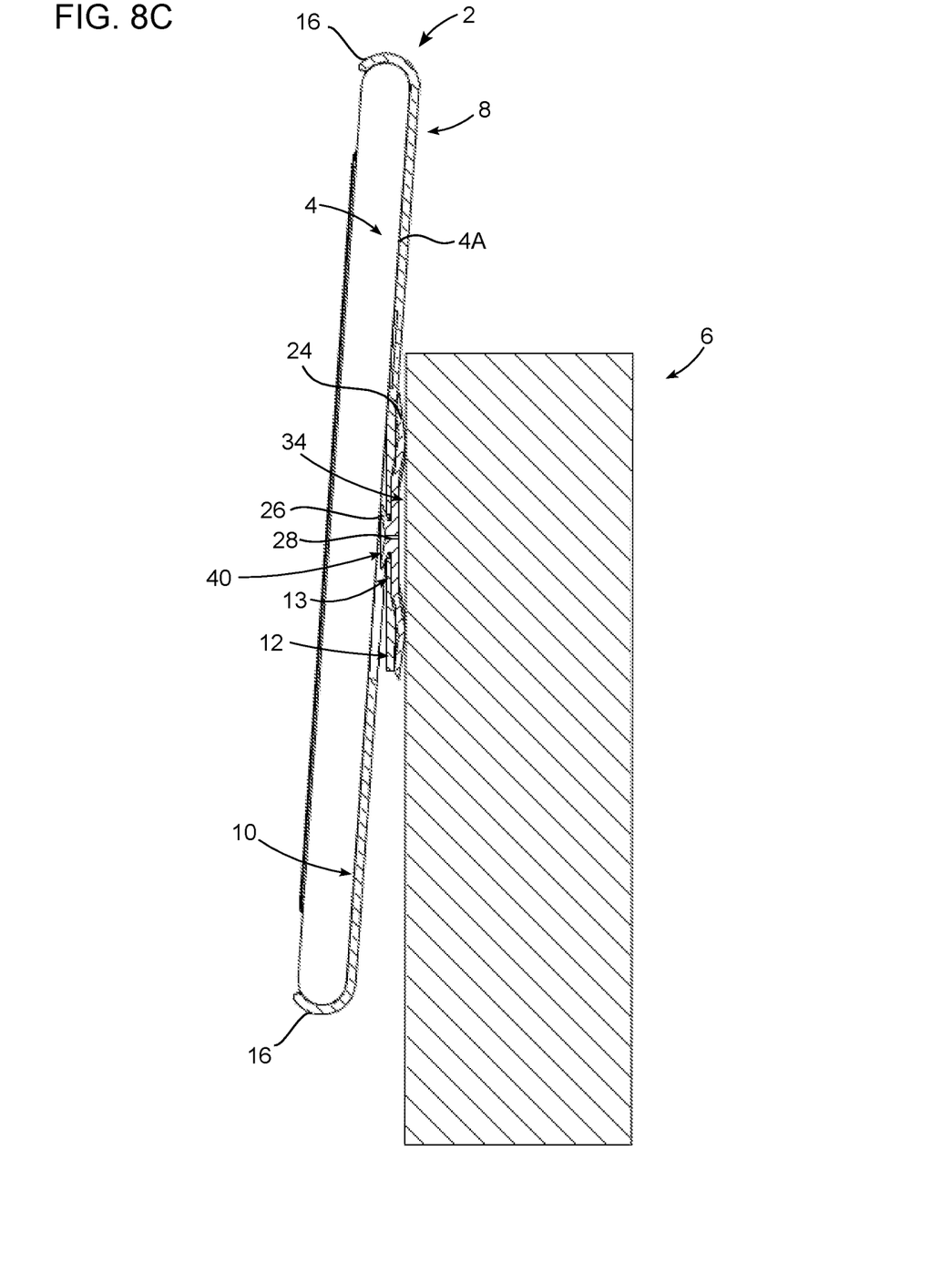
FIG. 8C is a cross-sectional view corresponding to FIG. 8A, showing a second stage of object holder detachment in which of the object holder and the object held thereby have undergone further movement away from the reference surface.
Figure 8D:
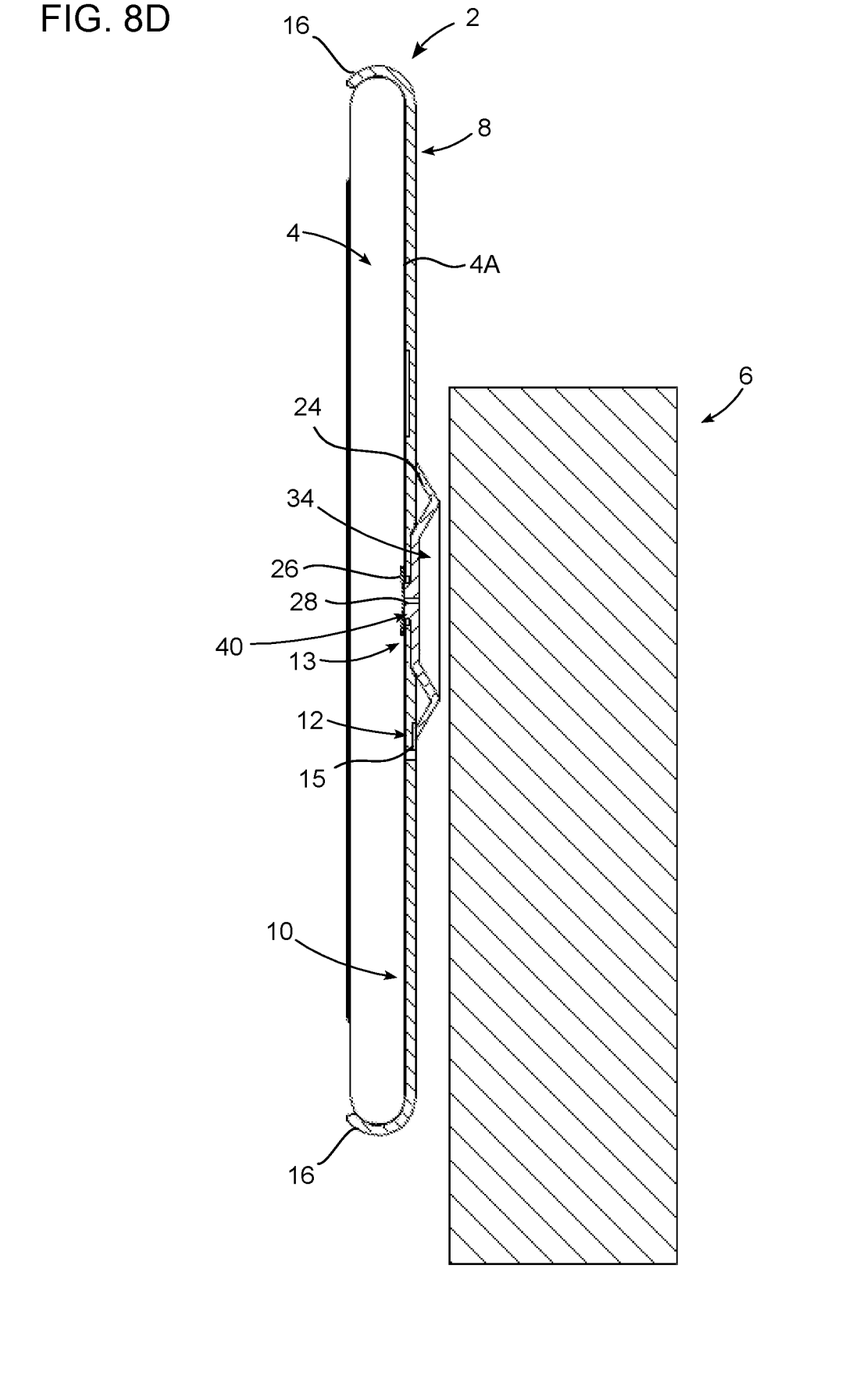
FIG. 8D is a cross-sectional view corresponding to FIG. 8A, showing a third stage of object holder detachment in which the object holder and the object held thereby have been completely detached from the reference surface.

FIG. 8C depicts a further point in the detachment process in which the object holder 2 has been maneuvered further away from the reference surface 6. In particular, the object holder 2 has been maneuvered to the point where the suction force between the inner seal member 26 and the object 4 is exceeded. When this occurs, the inner seal member 26 breaks its substantially airtight seal with the object 4. This vents the inner controlled pressure zone 40, which in turn vents the outer controlled pressure zone 34 through the interconnecting vent port 28. As a result, the negative differential pressure previously established in the outer controlled pressure zone 34 is lost, and the suction force between the outer seal member 24 and the reference surface 6 is released. As shown in FIG. 8D, the object holder 2 will now easily separate from the reference surface 6 without discernible resistance.

Accordingly, an object holder with quick-release anchoring capability has been disclosed. Reference in the present disclosure to an "embodiment" means that a particular feature, structure or characteristic described in connection with the embodiment may be included in at least one embodiment of the disclosed device. Thus, the appearances of the term "embodiment" in various places throughout the specification are not necessarily all referring to the same embodiment.

For purposes of explanation, specific configurations and details have been set forth herein in order to provide a thorough understanding of the present invention. However, it will be apparent to one of ordinary skill in the art that embodiments of the present invention may be practiced without the specific details presented herein. Furthermore, well-known features may have been omitted or simplified in order not to obscure the present invention. Various examples have been given throughout this description. These examples are merely descriptions of specific embodiments of the invention. The scope of the claimed subject matter is not limited to the examples given.

As used herein, the terms such as "upper," "lower," "top," "bottom," "vertical," "vertically," "lateral," "laterally," "inner," "outer," "outward," "inward," "front," "frontward," "forward," "rear," "rearward," "upwardly," "downwardly," "inside," "outside," "interior," "exterior," and other orientational descriptors are intended to facilitate the description of the example embodiments of the present disclosure, and are not intended to limit the structure of the example embodiments of the present disclosure to any particular position or orientation. Terms of degree, such as "substantially" or "approximately" are understood by those of ordinary skill to refer to reasonable ranges outside of the given value, for example, general tolerances associated with manufacturing, assembly, and use of the described embodiments. Terms of rough approximation, such as "generally," are understood by those of ordinary skill to refer to a characteristic or feature of that bears resemblance to something, such that it is reasonable to draw a comparison to facilitate understanding, without requiring that the characteristic or feature be exactly the same, or even substantially the same, as the thing to which it is compared.

Although example embodiments have been shown and described, it should be apparent that many variations and alternate embodiments could be implemented in accordance with the present disclosure. It is understood, therefore, that the invention is not to be limited except in accordance with the appended claims and equivalents thereof.

What is claimed is:

1. An object holder with releasable anchoring capability, comprising:
   an object carrier configured to hold an object while maintaining a fixed positional relationship therewith, the object carrier including an object carrier base arranged for interposition between the object and an external reference surface when the object is mounted to the reference surface using the object holder;
   a vacuum release actuator integrally formed on the object carrier base and being displaceable relative to the object carrier base in order to separate from the object along an axis that extends normal to the reference surface;
   an anchor member carried by vacuum release actuator;
   the anchor member including an outer seal member, an inner seal member, and an interconnecting vent port;
   the outer seal member being arranged to engage the reference surface and form a substantially airtight seal therewith that defines an outer controlled pressure zone, the outer controlled pressure zone including a region located between the outer seal member and the reference surface;
   the inner seal member being arranged to engage the object and form a substantially airtight seal therewith that defines an inner controlled pressure zone, the inner controlled pressure zone comprising a region located between the inner seal member and the object;
   the vent port having an outer end in fluid communication with the outer controlled pressure zone and an inner end in fluid communication with the inner controlled pressure zone; and
   whereby when the object holder holds the object and is mounted to the reference surface by virtue of the inner and outer controlled pressure zones maintaining a negative pressure differential relative to an external ambient pressure, the inner and outer controlled pressure zones can be vented by manipulating the object carrier away from the reference surface to separate the object and the vacuum release actuator until the inner seal member breaks its substantially airtight seal with the object.

2. The object holder of claim 1, wherein the object carrier base comprises a substantially planar plate structure having an inner side arranged to oppose a side of the object that faces the reference surface, and an outer side arranged to oppose the reference surface.

3. The object holder of claim 1, wherein the object carrier base extends across an entire side of the object that faces the reference surface.

4. The object holder of claim 1, wherein the object carrier includes one or more holding elements arranged on a periphery of the object carrier base.

5. The object holder of claim 4, wherein the one more holding elements are angled relative to a major surface portion of the object carrier base that faces the reference surface in order to engage one or more sides of the object that do not face the reference surface.

6. The object holder of claim 1, wherein the vacuum release actuator comprises a flexible portion of the object carrier base.

7. The object holder of claim 1, wherein the vacuum release actuator comprises a pivotable or bendable portion of the object carrier base.

8. The object holder of claim 1, wherein the vacuum release actuator comprises a flap formed on the object carrier base.

9. The object holder of claim 1, wherein the object carrier base has one or more discontinuities therein.

10. The object holder of claim 9, wherein one of the discontinuities defines the vacuum release actuator.

11. The object holder of claim 10, wherein a discontinuity that defines the vacuum release actuator is a slot or a slit that creates a flap representing the vacuum release actuator.

12. The object holder of claim 11, wherein the slot or slit that creates the flap representing the vacuum release actuator is substantially U-shaped.

13. The object holder of claim 1, wherein the vacuum release actuator is disposed proximate to a central portion of the object carrier base.

14. The object holder of claim 1, wherein the anchor member is detachably connected to the vacuum release actuator.

15. The object holder of claim 1, wherein the anchor member is integrally formed on the vacuum release actuator.

16. The object holder of claim 1, wherein the outer seal member is larger than the inner seal member, such that the outer seal member develops greater suction force than the inner seal member, and so that the inner seal member separates from the object before the outer seal member separates from the reference surface.

17. The object holder of claim 1, wherein one or both of the outer seal member and the inner seal member are cup-shaped.

18. The object holder of claim 1, wherein the object carrier comprises a smartphone case and the object is a smartphone or other handheld electronic device.

19. An object holder with releasable anchoring capability, comprising:
- an object carrier configured to hold an object while maintaining a fixed positional relationship therewith, the object carrier including an object carrier base arranged for substantially complete interposition between the object and an external reference surface when the object is mounted to the reference surface using the object holder;
- a vacuum release actuator disposed on the object carrier base and being displaceable relative to the object carrier base in order to separate from the object along an axis that extends normal to the reference surface;
- an anchor member carried by vacuum release actuator;
- the anchor member including an outer seal member, an inner seal member, and an interconnecting vent port;
- the outer seal member being arranged to engage the reference surface and form a substantially airtight seal therewith that defines an outer controlled pressure zone, the outer controlled pressure zone including a region located between the outer seal member and the reference surface;
- the inner seal member being arranged to engage the object and form a substantially airtight seal therewith that defines an inner controlled pressure zone, the inner controlled pressure zone comprising a region located between the inner seal member and the object;
- the vent port having an outer end in fluid communication with the outer controlled pressure zone and an inner end in fluid communication with the inner controlled pressure zone; and
- whereby when the object holder holds the object and is mounted to the reference surface by virtue of the inner and outer controlled pressure zones maintaining a negative pressure differential relative to an external ambient pressure, the inner and outer controlled pressure zones can be vented by manipulating the object carrier away from the reference surface to separate the object and the vacuum release actuator until the inner seal member breaks its substantially airtight seal with the object.

20. An object holder with releasable anchoring capability, comprising:
- an object carrier configured to hold an object while maintaining a fixed positional relationship therewith, the object carrier including a substantially planar object carrier base arranged for interposition between a reference surface-facing side of the object and an external reference surface when the object is mounted to the reference surface using the object holder;
- the object carrier further including one or more object holding elements arranged on a periphery of the object carrier base to engage one or more sides of the object that do not face the reference-surface;
- a vacuum release actuator disposed on the object carrier base and being displaceable relative to the object carrier base in order to separate from the object along an axis that extends normal to the reference surface;
- an anchor member carried by vacuum release actuator;
- the anchor member including an outer seal member, an inner seal member, and an interconnecting vent port;
- the outer seal member being arranged to engage the reference surface and form a substantially airtight seal therewith that defines an outer controlled pressure zone, the outer controlled pressure zone including a region located between the outer seal member and the reference surface;
- the inner seal member being arranged to engage the object and form a substantially airtight seal therewith that defines an inner controlled pressure zone, the inner controlled pressure zone comprising a region located between the inner seal member and the object;
- the vent port having an outer end in fluid communication with the outer controlled pressure zone and an inner end in fluid communication with the inner controlled pressure zone; and
- whereby when the object holder holds the object and is mounted to the reference surface by virtue of the inner and outer controlled pressure zones maintaining a negative pressure differential relative to an external ambient pressure, the inner and outer controlled pressure zones can be vented by manipulating the object carrier away from the reference surface to separate the object and the vacuum release actuator until the inner seal member breaks its substantially airtight seal with the object.

* * * * *